United States Patent Office 3,534,550
Patented Oct. 20, 1970

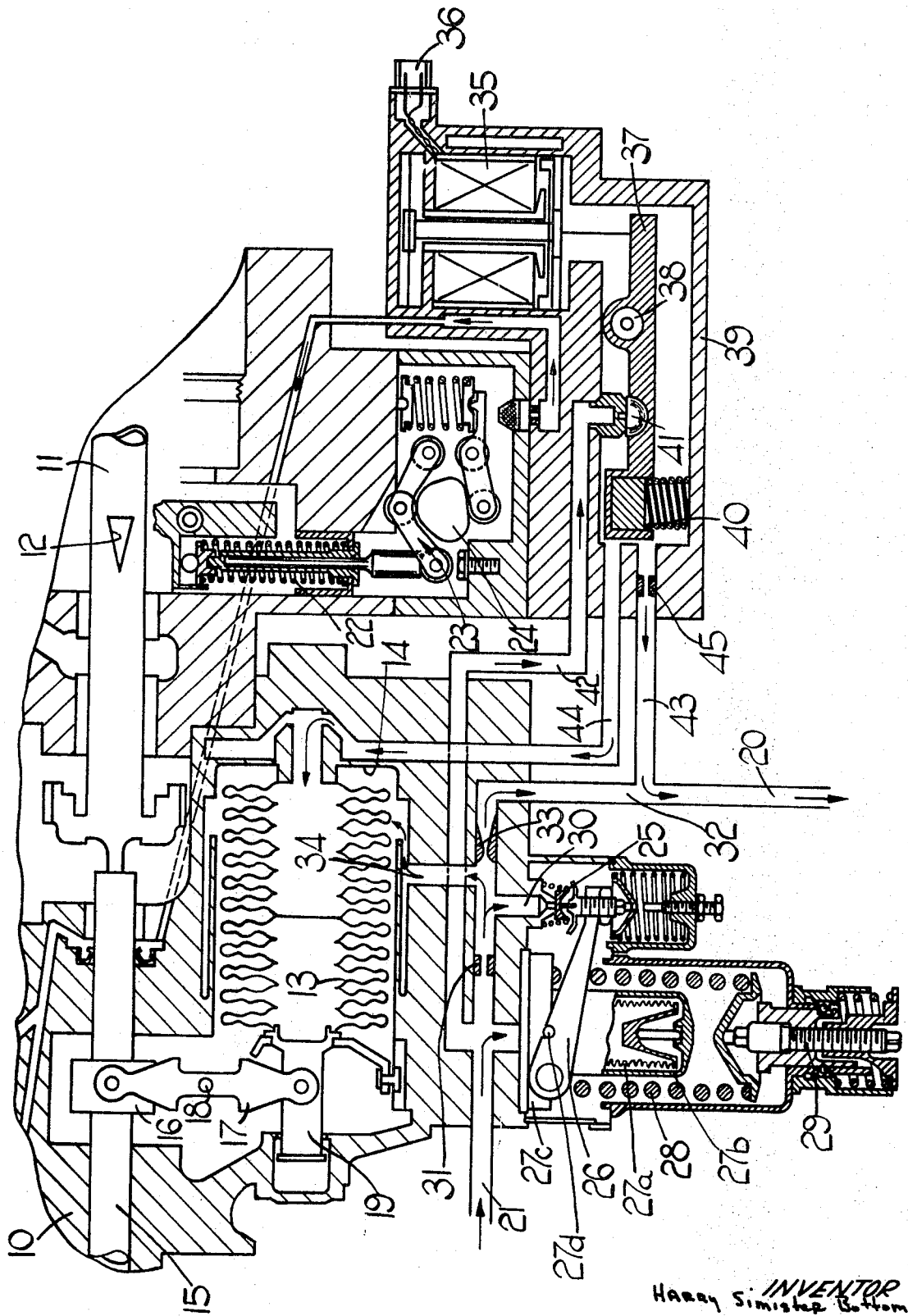

3,534,550
ELECTRICALLY OPERABLE TRIM DEVICE FOR GAS TURBINE ENGINE FUEL SYSTEMS
Harry Simister Bottoms, Solihull, England, assignor to Joseph Lucas (Industries) Limited, Birmingham, England, a British company
Filed Feb. 19, 1968, Ser. No. 706,403
Int. Cl. F02c 9/08, 3/02
U.S. Cl. 60—39.28
2 Claims

ABSTRACT OF THE DISCLOSURE

An electrically operable trim device for a fuel control apparatus for supplying fuel to a gas turbine engine in which a rotatable and axially movable sleeve which controls the fuel flow from an inlet to an outlet with the axial position of the sleeve determining the flow rate of fuel supply to the engine is operably connected to a pressure sensitive device which determines the axial position of the sleeve. An electrically operable valve is located in a chamber for controlling the entry of compressor fluid into the chamber and a restricted outlet from the chamber provides communication between the chamber and a conduit subject to the pressure existing at the downstream side of the primary stage of the compressor. A second outlet provides communication between the chamber and the interior of the pressure sensitive device with the valve normally preventing compressor pressure entering the chamber. The valve is provided with means controlled by temperature conditions existing in the engine for opening the valve to allow compressor pressure to enter the chamber, the restricted outlet for causing a pressure rise in the second outlet and thus in the pressure sensitive device so that such rising pressure in the capsule effects axial movement of the sleeve to reduce the amount of fuel supplied to the engine.

BACKGROUND OF THE INVENTION

This invention relates to an electrically operable device for providing a trimming signal related to a selected parameter to be applied to a gas turbine engine fuel control apparatus to vary the fuel flow to the engine in accordance with changes in that parameter.

The object of the invention is to provide a device of the kind referred to in a convenient form.

SUMMARY OF THE INVENTION

In accordance with the present invention, an electrically operable trim device for a fuel control apparatus for supplying fuel to a gas turbine engine having a compressor driven turbine and a jet pipe, includes a body provided with a rotatable and axially movable sleeve for controlling fuel flow from an inlet to an outlet with the axial position of the sleeve determining the flow rate of fuel supplied to the engine, said body having a chamber therein, a capsule located in the chamber operably connected to the sleeve for determining the axial position of the sleeve, first conduit means in the body subject to compressor delivery pressure, second conduit means in the body subject to the pressure existing at the downstream side of the primary stage of the compressor, means defining a further chamber, passage means providing communication between the first conduit means and the further chamber, a first outlet passage providing communication between the further chamber and the second conduit means, a restrictor in the first outlet passage, a second outlet passage providing communication between the further chamber and the interior of the capsule, an electrically operable valve located in the further chamber normally closing the passage means, and means operably related to the valve and controlled by temperature conditions existing in the jet pipe for opening the valve to allow flow from the first conduit means through the passage means, further chamber, the first outlet passage and restrictor thus causing a rise in pressure in the second outlet passage and hence in the capsule so that such rising pressure in the capsule effects axial movement of the sleeve to reduce the amount of fuel supplied to the engine.

DETAILED DESCRIPTION OF THE DRAWINGS

The invention will now be described by way of example with reference to the accompanying drawing which illustrates part of a fuel control apparatus for a gas turbine engine.

DETAILED DESCRIPTION OF THE INVENTION

The apparatus illustrated includes in a composite body 10 a sleeve 11 which is mounted for rotation and also axial sliding movement to control the flow of fuel from an inlet to an outlet in the body (not illustrated) through a set of triangular openings 12 in the sleeve. The axial position of the sleeve 11 within the body 10, and also with respect of a slidable coaxial sleeve (not shown) surrounding the sleeve 11 determines the rate of flow of fuel passing through the opening 12 and therefore supplied to the engine. The axial position of the sleeve 11 is determined in accordance with engine speed (in a manner not illustrated), and also in accordance with the total length of a livided capsule 13 within a chamber 14 in the body 10.

The capsule 13 is collapsible and expansible and is connected with an extension 15 of the sleeve 11 through a collar 16, and a lever 17 which is pivotally mounted respectively to the collar 16, and to a rod 19 fixed to the end of the capsule 13. One portion of the capsule 13 is evacuated, and the other portion is subjected, in its interior, to a pressure realted to the pressure conditions obtaining at the downstream side of the first or primary stage of the compressor in the engine with which the system is associated. A passage 20 communicates with this stage of the compressor, and in a manner to be described, ultimately communicates with the interior of said other portion of the capsule 13. There is also a passage 21 which is subjected to compression delivery pressure and this ultimately communicates with the interior of the chamber 14, and therefore provides pressure acting upon the exterior of the capsule 13.

The speed responsive device which is not illustrated but which acts upon the sleeve 11 to move it axially in accordance with engine speed is itself modified in accordance with the stress in a spring 22, with the length of the spring being controlled by a mechanism indicated generally at 23. This mechanism includes a cam 24 which, in turn, is controlled by an operator, or in the case where the gas turbine engine is fitted to an aircraft, by the pilot.

In order to ensure that compressor delivery pressure in the associated engine does not exceed a predetermined value, there is a device including a valve closure member 25 carried on a lever 26, and the lever is pivotally mounted upon a fixed part of the apparatus. The compressor delivery pressure in the passage 21 is applied to a device having a bellows 27a surrounded by a tubular part 27b. A spring 28 acts on a flange 27c of the tubular part 27b which, in turn, carries a pair of pins 27d. Rise in pressure in the passage 21 above a predetermined value, causes the bellows 27a to expand to move the part 27b with its pins 27c, with the latter engaging the lever 26 to move the valve closure member 25 in a direction to open a passage 30, so that air from the passage 21 can escape into the interior of the portion of the body housing the lever 26 and spring 28 and associated mechanism, from which it can escape to atmosphere. The air in the passage 30 is however obtained from the passage 21 through a restrictor 31, and there is a further passage 32 communicating with the passage 20, and including a further restrictor 33. The passage 32 also communicates with the passage 30, so that the pressure in the passage 30 is a pressure intermediate the pressures obtaining in the passages 20 and 21 respectively.

A still further passage 34 affords communication between the interior of the chamber 14 and the region between the two restrictors 31, 33 so as to partake of pressure conditions identical to those obtaining in the passage 30.

This arrangement thus far described has applied to it a trim device, which in this example, is responsive to temperature conditions obtaining in the jet pipe of the associated engine, with such temperature conditions being conveyed to the device in the form of an electrical signal applied to a solenoid 35, through an input socket 36.

The armature of the electrical solenoid 35 is connected to a lever 37 pivotally mounted intermediate its ends, at 38, upon a body 39 which is secured to the body 10 of the associated apparatus.

At the opposite end of the lever 37 from the solenoid 35 is a spring 40 tending to urge the lever 37 about its pivot 38 to a position in which a valve closure member 41 carried by the lever between the pivot 38 and the spring 40 closes the end of a passage 42 communicating with the passage 21. There are two outlet passages 43, 44 from the chamber defined in the interior of the body 39 in which the lever 37 is situated. The outlet passage 43 incorporates a restrictor 45 and communicates with the passage 20, and thus is at a lower pressure than that obtaining in the passage 42. The further outlet passage 44 communicates with the interior of the capsule 13, and the arrangement is such that in use the pressure in the passage 44 and therefore in the interior of the capsule 13 is dependent upon the opening of the valve closure member 41 which in turn is determined by the electrical signal received in the solenod 35.

Therefore pressure conditions within the capsule 13 ar determined in use by pressure obtained through the passages 20, 43 and 44. This pressure is modified by the temperature signal energizing the solenoid 35, which moves the valve closure member 41 to open the passage 42 to permit flow to pass through the restrictor 45, thus causing a rise in pressure in the passage 44 and in the capsule 13. Rising pressure in the capsule 13 causes movement of the sleeve 11 to reduce the quantity of fuel delivered to the engine.

Having thus described my invention what I claim as new and desire to secure by Letters Patent is:

1. An electrically operable trim device for a fuel control apparatus for supplying fuel to a gas turbine engine having a compressor driven turbine and a jet pipe, including a body having a rotatable and axially movable sleeve for controlling fuel flow from an inlet to an outlet with the axial position of the sleeve determining the flow rate of fuel supplied to the engine, said body being provided with a chamber, a capsule located in the chamber operably connected to the sleeve for determining the axial position of the sleeve, first conduit means in the body subject to compression delivery pressure, second conduit means in the body subject to the pressure existing at the downstream side of the primary stage of the compressor, said first and second conduit means being connctd to said chamber exteriorly of said capsule means defining a further chamber, passage means providing communication between the first conduit means and the further chamber a first outlet passage providing communication between the further chamber and the second conduit means, a restrictor in the first outlet passage, a second outlet passage providing communication between the further chamber and the interior of the capsule, an electrically operable valve located in the further chamber normally closing the passage means, and means operably related to the valve and controlled by temperature conditions existing in the jet pipe for opening the valve to allow flow from the first conduit means through the passage means, further chamber, the first outlet passage and restrictor thus causing a rise in pressure in the second outlet passage and hence in the capsule so that such rising pressure in the capsule effects axial movement of the sleeve for reducing the amount of fuel supplied to the engine.

2. The electrically operable trim device as claimed in claim 1 in which said means operably related to the valve includes an electrical solenoid having its armature connected to the valve and the solenoid being opearted in accordance with an electrical signal realted to the temperature conditions existing in the jet pipe.

References Cited

UNITED STATES PATENTS

| 3,007,303 | 11/1961 | Williams | 60—241 X |
| 3,252,283 | 5/1966 | Jackson et al. | 60—39.28 |
| 3,349,557 | 10/1967 | Johnson | 60—39.28 |
| 3,382,673 | 5/1968 | Mowbray | 60—39.28 |

A. LAWRENCE SMITH, Primary Examiner